(12) United States Patent
Wang et al.

(10) Patent No.: US 9,203,491 B2
(45) Date of Patent: Dec. 1, 2015

(54) METHOD FOR DETERMINING PRECODING MATRIX INDICATOR, USER EQUIPMENT, AND BASE STATION EVOLVED NODEB

(71) Applicant: Huawei Technologies Co., Ltd., Shenzhen, Guangdong (CN)

(72) Inventors: Jianguo Wang, Bonn (DE); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/569,522

(22) Filed: Dec. 12, 2014

(65) Prior Publication Data

US 2015/0098516 A1    Apr. 9, 2015

Related U.S. Application Data

(63) Continuation of application No. PCT/CN2012/076898, filed on Jun. 14, 2012.

(51) Int. Cl.
| | |
|---|---|
| *H04B 7/02* | (2006.01) |
| *H04L 1/02* | (2006.01) |
| *H04B 7/04* | (2006.01) |
| *H04B 7/06* | (2006.01) |
| *H04L 25/03* | (2006.01) |

(52) U.S. Cl.
CPC ............ *H04B 7/0456* (2013.01); *H04B 7/0469* (2013.01); *H04B 7/0478* (2013.01); *H04B 7/0617* (2013.01); *H04B 7/0639* (2013.01); *H04L 25/03949* (2013.01)

(58) Field of Classification Search
CPC ...................................................... H04B 7/0456
See application file for complete search history.

(56) References Cited

U.S. PATENT DOCUMENTS

| | | | |
|---|---|---|---|
| 8,391,392 B2* | 3/2013 | Melzer et al. ................. | 375/267 |
| 2011/0216846 A1* | 9/2011 | Lee et al. ....................... | 375/295 |
| 2013/0028341 A1* | 1/2013 | Ayach et al. ................... | 375/267 |
| 2013/0114654 A1* | 5/2013 | Gomadam .................... | 375/219 |
| 2013/0308715 A1* | 11/2013 | Nam et al. ..................... | 375/267 |
| 2014/0177745 A1* | 6/2014 | Krishnamurthy et al. .... | 375/267 |

FOREIGN PATENT DOCUMENTS

| | | |
|---|---|---|
| CN | 101635612 A | 1/2010 |
| CN | 101686079 A | 3/2010 |
| CN | 101969366 A | 2/2011 |
| CN | 102122983 A | 7/2011 |
| EP | 2 820 773 A1 | 1/2015 |
| WO | WO 2011/082626 A1 | 7/2011 |

* cited by examiner

*Primary Examiner* — Erin File

(57) ABSTRACT

The present invention relates to a method for determining a precoding matrix indicator, a user equipment UE, a base station eNB, and a system. The method includes: receiving a reference signal sent by a base station; selecting, based on the reference signal, a precoding matrix from a codebook, where a precoding matrix W included in the codebook is a product of two matrices $W_1$ and $W_2$, where $W_1$ is a block diagonal matrix, where each block matrix is a Kronecker product of a matrix $A_i$ and a matrix $B_i$; and sending a precoding matrix indicator PMI to the base station, where the PMI corresponds to the selected precoding matrix, so that the base station obtains the precoding matrix according to the PMI.

20 Claims, 2 Drawing Sheets

METHOD FOR DETERMINING PRECODING MATRIX INDICATOR, USER EQUIPMENT, AND BASE STATION EVOLVED NODEB

CROSS-REFERENCE TO RELATED APPLICATIONS

This application is a continuation of International Application No. PCT/CN2012/076898, filed on Jun. 14, 2012, which is hereby incorporated by reference in its entirety.

TECHNICAL FIELD

The present invention relates to the field of mobile communications, and in particular, to a method for determining a precoding matrix indicator, a user equipment, a base station evolved NodeB, and a system.

BACKGROUND

A multiple-input multiple-output (multiple-input multiple-output, MIMO) radio system can obtain diversity and array gains by means of transmit precoding and receive signal combination. A system that utilizes precoding may be expressed as:

$$y=H\hat{V}s+n$$

where y represents a vector of a received signal, H represents a channel matrix, $\hat{V}$ represents a precoding matrix, s represents a vector of a transmitted symbol, and n represents a measurement noise.

Optimal precoding generally requires that channel state information (Channel State Information, CSI) is completely known by a transmitter. A commonly used method is that a user equipment (User Equipment, UE) or a mobile station (Mobile Station, MS) (hereinafter generally referred to as UE) quantizes instantaneous CSI and feeds back the CSI to a NodeB (NodeB), which includes a base station (Base station, BS), an access point (Access Point), a transmission point (Transmission Point, TP), or an evolved NodeB (Evolved Node B, eNB), where the evolved NodeB is generally referred to as an eNB. CSI information that is fed back by an existing Long Term Evolution (Long Term Evolution, LTE) R8 system includes information such as a rank indicator (Rank Indicator, RI), a precoding matrix indicator (Precoding Matrix Indicator, PMI), and a channel quality indicator (Channel Quality Indicator, CQI), where the RI and the PMI respectively indicate the number of layers used and a precoding matrix. A set of used precoding matrices is generally referred to as a codebook, where each precoding matrix is a codeword in the codebook. To reduce system costs and meet higher requirements on the system capacity and coverage, an active antenna system (AAS) is already widely deployed in practice. Compared with an existing base station antenna, the AAS further provides a degree of freedom in design for the vertical direction.

An existing 4-antenna codebook, which is designed based on Householder transformation, of an LTE R8 system and an existing 8-antenna codebook, which is designed based on dual codebooks, of an LTE R10 system are mainly designed for a horizontal antenna, but a degree of freedom of a vertical antenna is not considered. When the 4-antenna codebook and the 8-antenna codebook are directly used in deployment of an AAS base station antenna, system performance severely deteriorates.

SUMMARY

Embodiments of the present invention provide a method for determining a precoding matrix indicator, a user equipment, a base station evolved NodeB, and a system, which use a precoding matrix that supports vertical and horizontal quantization, and can fully use a degree of freedom of an active antenna system in a vertical direction, thereby improving CSI feedback accuracy and system throughput.

According to one aspect, an embodiment of the present invention provides a method for determining a precoding matrix indicator, where the method includes:

receiving a reference signal sent by a base station;

selecting, based on the reference signal, a precoding matrix from a codebook, where a precoding matrix W included in the codebook is a product of two matrices $W_1$ and $W_2$, where $W_1$ is a block diagonal matrix, that is, $W_1=\text{diag}\{X_1, \ldots, X_{N_B}\}$, where each block matrix $X_i$ is a kronecker product of a matrix $A_i$ and a matrix $B_i$, that is, and $X_i=A_i \otimes B_i$, and $1 \leq i \leq N_B$; the $W_1$ includes at least one block matrix, that is, the number of block matrices is $N_B \geq 1$; and sending a precoding matrix indicator PMI to the base station, where the PMI corresponds to the selected precoding matrix, so that the base station obtains the precoding matrix according to the PMI.

According to another aspect, an embodiment of the present invention further provides a method for determining a precoding matrix indicator, where the method includes:

sending a reference signal to a user equipment UE; and receiving a precoding matrix indicator PMI sent by the UE, where the PMI corresponds to a precoding matrix that is selected by the UE, based on the reference signal, from a codebook; and a precoding matrix W included in the codebook is a product of two matrices $W_1$ and $W_2$, where $W_1$ is a block diagonal matrix, that is, $W_1=\text{diag}\{X_1, \ldots, X_{N_B}\}$, where each block matrix $X_i$ is a kronecker product of a matrix $A_i$ and a matrix $B_i$, that is, $X_i=A_i \otimes B_i$, and $1 \leq i \leq N_B$; and the matrix $W_1$ includes at least one block matrix, that is, the number of block matrices is $N_B \geq 1$.

According to another aspect, correspondingly, an embodiment of the present invention provides a user equipment UE, including:

a receiving unit, configured to receive a reference signal sent by a base station;

a selecting unit, configured to select, based on the reference signal, a precoding matrix from a codebook, where a precoding matrix W included in the codebook is a product of two matrices $W_1$ and $W_2$, where $W_1$ is a block diagonal matrix, that is, $W_1=\text{diag}\{X_1, \ldots, X_{N_B}\}$, where each block matrix $X_i$ is a kronecker product of a matrix $A_i$ and a matrix $B_i$, that is, $X_i=A_i \otimes B_i$ and $1 \leq i \leq N_B$; and the $W_1$ includes at least one block matrix, that is, the number of block matrices is $N_B \geq 1$; and a sending unit, configured to send a precoding matrix indicator PMI to the base station, where the PMI corresponds to the selected precoding matrix, so that the base station obtains the precoding matrix according to the PMI.

According to another aspect, correspondingly, an embodiment of the present invention provides a base station eNB, including:

a sending unit, configured to send a reference signal to a user equipment UE; and a receiving unit, configured to receive a precoding matrix indicator PMI sent by the UE, where the PMI corresponds to a precoding matrix that is selected by the UE, based on the reference signal, from a codebook; and a precoding matrix W included in the codebook is a product of two matrices $W_1$ and $W_2$, where $W_1$ is a block diagonal matrix, that is, $W_1=\text{diag}\{X_1, \ldots, X_{N_B}\}$, where each block matrix $X_i$ is a kronecker product of a matrix $A_i$ and a matrix $B_i$, that is, $X_i=A_i \otimes B_i$, and $1 \leq i \leq N_B$; and the matrix $W_1$ includes at least one block matrix, that is, the number of block matrices is $N_B \geq 1$.

According to another aspect, correspondingly, an embodiment of the present invention further provides a system for determining a precoding matrix indicator, including the foregoing terminal UE and base station eNB.

The method for determining a precoding matrix indicator, the user equipment UE, the base station eNB, and the system according to the embodiments of the present invention utilize a precoding matrix that supports vertical and horizontal quantization, which can not only use a degree of freedom in a horizontal direction, but also can use a degree of freedom in a vertical direction, thereby greatly improving CSI feedback accuracy and system throughput.

DETAILED DESCRIPTION

The following further describes the technical solutions of the present invention in detail with reference to the accompanying drawings and embodiments.

According to embodiments of the present invention, a codebook scheme is designed for an actual network deployment and antenna configuration, and especially for a base station antenna configuration condition of an active antenna system. According to the codebook scheme, a UE selects and reports a PMI, and a NodeB performs precoding according to PMI information reported by the UE, so as to improve performance of a system with the foregoing antenna configuration and especially with the AAS base station antenna configuration. The base station antenna can not only use a degree of freedom in a horizontal direction, but also can use a degree of freedom in a vertical direction.

Figure 1:
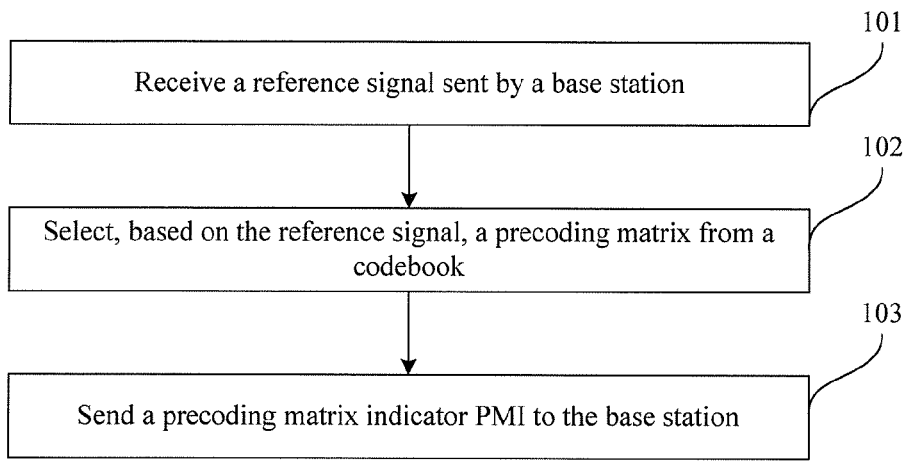
FIG. 1 is a flowchart of a first embodiment of a method for determining a precoding matrix indicator according to the present invention.

FIG. 1 is a flowchart of a first embodiment of a method for determining a precoding matrix indicator according to the present invention. As shown in the figure, this embodiment specifically includes the following steps:

Step 101: Receive a reference signal sent by a base station.

Specifically, the reference signal sent by the base station may include a channel state information reference signal (channel state information Reference Signal, CSI RS), a demodulation reference signal (demodulation RS, DM RS), or a cell-specific reference signal (cell-specific RS, CRS). A user equipment UE may obtain a resource configuration of the reference signal by receiving a notification (for example, RRC (Radio Resource Control) signaling or downlink control information DCI) from an eNB or based on a cell identity ID, and obtain the reference signal from a corresponding resource or subframe.

Step 102: Select, based on the reference signal, a precoding matrix from a codebook, where a precoding matrix W included in the codebook is a product of two matrices $W_1$ and $W_2$, that is:

$$W = W_1 W_2 \qquad (1)$$

where $W_1$ is a block diagonal matrix, that is:

$$W_1 = \text{diag}\{X_1, \ldots, X_{N_B}\} \qquad (2)$$

where each block matrix $X_i$ is a Kronecker (kronecker) product of a matrix $A_i$ and a matrix $B_i$, that is:

$$X_i = A_i \otimes B_i, 1 \leq i \leq N_B \qquad (3)$$

the $W_1$ includes at least one block matrix, that is, the number $N_B$ of block matrices is:

$$N_B \geq 1 \qquad (4)$$

Specifically, each column of the matrix $A_i$ or of the matrix $B_i$ in formula (3) may be a discrete Fourier transform (Discrete Fourier Transform, DFT) vector or may be a column vector of a Hadamard (Hadamard) matrix, that is:

$$A_i = [a_0 a_1 \ldots a_{N_a-1}] \qquad (5)$$

$$B_i = [b_0 b_1 \ldots b_{N_b-1}] \qquad (6)$$

therefore:

$$a_k \in \{f_0, f_1, \ldots, f_{N_f-1}\}, k=0, \ldots N_a-1 \qquad (7)$$

or $$a_k \in \{h_0, h_1, \ldots, h_{N_h-1}\}, k=0, \ldots, N_a-1 \qquad (8)$$

or $$b_l \in \{f_0, f_1, \ldots, f_{N_f-1}\}, l=0, \ldots, N_b-1 \qquad (9)$$

or $$b_l \in \{h_0, h_1, \ldots, h_{N_h-1}\}, l=0, \ldots, N_b-1 \qquad (10)$$

where $N_a$ and $N_b$ represent the numbers of columns of the matrix $A_i$ and the matrix $B_i$, respectively; $h_m$, $m=0, \ldots, N_h-1$ represents a column vector of the Hadamard matrix, where $N_h$ represents the number of columns of the Hadamard matrix; and $f_n$, $n=0, \ldots, N_f-1$ represents a DFT vector, where $N_f$ is the number of DFT vectors, and the DFT vector $f_n$ may be represented as:

$$f_n \left[ e^{j\frac{2\pi \cdot 0 \cdot n}{N}} \quad e^{j\frac{2\pi \cdot 1 \cdot n}{N}} \quad \ldots \quad e^{j\frac{2\pi \cdot (M-1) \cdot n}{N}} \right]^T \qquad (11)$$

where both M and N are integers.

Specifically, the matrix $A_i$ or the matrix $B_i$ in formula (3) may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be:

$$A_i = a_0, i=1,2 \qquad (12)$$

where:

$$a_0 \in \{f_0, f_1, \ldots, f_3\} \qquad (13)$$

$$[f_0, f_1, f_2, f_3] = \text{diag}\{1, e^{jn\pi/8}, e^{jn\pi/4}, e^{j3n\pi/8}\} F_4, \qquad (14)$$
$$n = 0, 1, 2, 3$$

-continued $$F_4 = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix} \quad (15)$$

or $$a_k \in \{h_0, h_1, \ldots, h_3\}, \quad k = 0, \ldots, 3 \quad (16)$$

$$[h_0, h_1, \ldots, h_3] = \frac{1}{2} \times H_4 \quad (17)$$

where $H_4$ is a Hadamard (Hadamard) matrix of order 4.

$$B_i \in \{[\ b_{(2k)mod32} \ b_{(2k+1)mod32} \ b_{(2k+2)mod32} \ b_{(2k+3)mod32}\ ]: k = 0, 1, \ldots, 15\}, i = 1, 2 \quad (18)$$

$$b_{(2k+l)mod32} = [\ e^{j\frac{2\pi \cdot 0 \cdot ((2k+l)mod32)}{32}} \quad e^{j\frac{2\pi \cdot 1 \cdot ((2k+l)mod32)}{32}} \quad e^{j\frac{2\pi \cdot 2 \cdot ((2k+l)mod32)}{32}} \quad e^{j\frac{2\pi \cdot 3 \cdot ((2k+l)mod32)}{32}}\ ], \quad (19)$$

$$l = 0, 1, 2, 3$$

where x mod y represents an operation of x mod y; and j represent a unit pure imaginary number, that is, $j=\sqrt{-1}$; or $B_i$ is a precoding matrix in a 4-antenna rank-4 codebook of an LTE R8 system.

$$W_2 \in \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\} \quad (20)$$

$$Y \in \{\tilde{e}_1, \tilde{e}_2, \tilde{e}_3, \tilde{e}_4\} \quad (21)$$

or $$W_2 \in \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\} \quad (22)$$

$$(Y_1, Y_2) \in \quad (23)$$
$$\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2)(\tilde{e}_2, \tilde{e}_3)(\tilde{e}_1, \tilde{e}_4)(\tilde{e}_2, \tilde{e}_4)\}$$

where $\tilde{e}_n$, n=1, 2, 3, 4 represents a 4×1 selection vector in which all elements are 0 except the $n^{th}$ element being 1.

In an example in which the number of block matrices is $N_B=2$ and there are 32 transmit antennas, matrices that form the precoding matrix W may also separately be:

$$A_i = [a_0 a_1], i=1,2 \quad (24)$$

$$a_0, a_1 \in \{f_0, f_1, \ldots, f_3\} = (25)$$

where $f_i$, i=0, ..., 3 is shown in formula (14).
or $$a_0, a_1 \in \{h_0, h_1, \ldots, h_3\} \quad (26)$$

where $h_i$, i=0, ... 3 is shown in formula (17);
the matrix $B_i$, i=1, 2 is shown in formulas (18) and (19), or the matrix $B_i$ is a precoding matrix in a 4-antenna rank-4 codebook of an LTE R8 system;

$$W_2 \in \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\} \quad (27)$$

$$Y \in \{e_1, e_2, e_3, e_4, e_5, e_6, e_7, e_8\} \quad (28)$$

or $$W_2 \in \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\} \quad (29)$$

$$(Y_1, Y_2) \in \quad (30)$$
$$\{(e_1, e_1), (e_2, e_2), (e_3, e_3), (e_4, e_4), (e_1, e_2)(e_2, e_3)(e_1, e_4)(e_2, e_4)\}$$

where $e_n$, n=1, 2, ..., 8 represents an 8×1 selection vector in which all elements are 0 except the $n^{th}$ element being 1.

Specifically, the selecting, based on the reference signal, a precoding matrix from a codebook includes:
obtaining, by the user equipment UE based on the reference signal, a channel estimate; and selecting, based on a predefined criterion such as a channel capacity or throughput maximization criterion, the precoding matrix from the codebook according to the channel estimate. Selecting, based on a predefined criterion, a precoding matrix is an existing technology, and details are not described herein.

Further, the selecting, based on the reference signal, a precoding matrix from a codebook includes:
selecting, based on the reference signal, the precoding matrix from a codebook subset, where
the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include:
a subset of the matrix $W_1$, the matrix $A_i$, the matrix $B_i$, or the matrix $W_2$.

The selecting, based on the codebook subset, the precoding matrix can further reduce feedback overheads and implementation complexity.

Further, the codebook subsets have a same subset of the matrix $W_1$ the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, i≠j may be unequal, or may also be equal. If there are multiple cases that $X_i$ and $X_j$, i≠j are equal, for example, $X_i$ and $X_j$, i≠j that are equal may appear in pairs, the feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power equalization.

Step 103: Send a precoding matrix indicator PMI to the base station, where the PMI corresponds to the selected precoding matrix, so that the base station obtains the precoding matrix according to the PMI.

Specifically, the precoding matrix is included in a precoding matrix set or a codebook; and the PMI is used to indicate the selected precoding matrix in the precoding matrix set or the codebook.

Specifically, the sending a precoding matrix indicator PMI to the base station includes: sending the precoding matrix indicator PMI to the base station, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . , 15.

Specifically, the sending a precoding matrix indicator PMI to the base station may also include: sending precoding matrix indicators $PMI_1$ and $PMI_2$ to the base station, where $PMI_1$ and $PMI_2$ are used to indicate the matrix $X_i = A_i \otimes B_i$, $1 \leq i \leq N_B$ in formula (2) and the matrix $W_2$, respectively; and in this case, the matrix $X_i = A_i \otimes B_i$, $1 \leq i \leq N_B$ and the matrix $W_2$ are respectively indicated by $PMI_1$ and $PMI_2$ in the codebook; or sending precoding matrix indicators $PMI_{11}$, $PMI_{12}$, and $PMI_2$ to the base station, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$, respectively; and in this case, the matrix $A_i$, $1 \leq i \leq N_B$, the matrix $B_i$, $1 \leq i \leq N_B$, and the matrix $W_2$ are respectively indicated by $PMI_{11}$, $PMI_{12}$, and $PMI_2$ in the codebook.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, the sending a precoding matrix indicator PMI to the base station may also include: sending precoding matrix indicators $PMI_{1,i}$, $1 \leq i \leq N_B$ and $PMI_2$ to the base station, where $PMI_{1,i}$, $1 \leq i \leq N_B$ and $PMI_2$ are used to indicate the matrix $X_i = A_i \otimes B_i$, $1 \leq i \leq N_B$ and the matrix $W_2$, respectively; or sending precoding matrix indicators $PMI_{11,i}$, $PMI_{12,i}$, and $PMI_2$ to the base station, where $PMI_{11,i}$, $PMI_{12,i}$, and $PMI_2$ are used to indicate the matrix $A_i$, $1 \leq i \leq N_B$, the matrix $B_i$, $1 \leq i \leq N_B$, and the matrix $W_2$, respectively.

Specifically, the sending a precoding matrix indicator PMI to the base station may also include: sending precoding matrix indicators $PMI_{1,i}$, $1 \leq i \leq N_B/2$ and $PMI_2$ to the base station, where $PMI_{1,i}$, $1 \leq i \leq N_B/2$ and $PMI_2$ are used to indicate a matrix $X_{2i-1} = X_{2i} = A_{2i} \otimes B_{2i}$, $1 \leq i \leq N_B/2$ and the matrix $W_2$, respectively; and in this case, $X_{2i-1} = X_{2i}$, and the matrices appear in pairs; or sending precoding matrix indicators $PMI_{11,i}$, $PMI_{12,i}$, and $PMI_2$ to the base station, where $PMI_{11,i}$, $PMI_{12,i}$, and $PMI_2$ are used to indicate a matrix $A_{2i-1} = A_{2i}$, $1 \leq i \leq N_B/2$, the matrix $B_{2i-1} = B_{2i}$, $1 \leq i \leq N_B/2$, and the matrix $W_2$, respectively; and in this case, $A_{2i-1} = A_{2i}$, $B_{2i} = B_{2i}$, and the matrices appear in pairs.

Specifically, the sending a precoding matrix indicator PMI to the base station may be sending, by the UE, the precoding matrix indicator PMI to the base station through a physical uplink control channel (Physical Uplink Control Channel, PUCCH) or a physical uplink shared channel (Physical Uplink Shared Channel, PUSCH).

Further, the sending a precoding matrix indicator PMI to the base station may be separately sending, by the UE by using different subframes or according to different periods, the foregoing $PMI_1$ and $PMI_2$; or $PMI_{11}$, $PMI_{12}$, and $PMI_2$; or $PMI_{1,i}$, $1 \leq i \leq N_B$, and $PMI_2$; or $PMI_{11,i}$, $PMI_{12,i}$, $1 \leq i \leq N_B$, and $PMI_2$; or $PMI_{1,i}$, $1 \leq i \leq N_B/2$, and $PMI_2$; or $PMI_{11,i}$, $PMI_{12,i}$, $1 \leq i \leq N_B/2$ and $PMI_2$ to the base station.

Further, the sending a precoding matrix indicator PMI to the base station may also be separately sending, by the UE for different subbands or subband sizes in a frequency domain, the foregoing $PMI_1$ and $PMI_2$; or $PMI_{11}$, $PMI_{12}$, and $PMI_2$; or $PMI_{1,i}$, $1 \leq i \leq N_B$, and $PMI_2$; or $PMI_{11,i}$, $PMI_{12,i}$, $1 \leq i \leq N_B$, and $PMI_2$; or $PMI_{1,i}$, $1 \leq i \leq N_B/2$, and $PMI_2$; or $PMI_{11,i}$, $PMI_{12,i}$, $1 \leq i \leq N_B/2$ and $PMI_2$ to the base station.

In this embodiment of the present invention, a user equipment determines and sends a precoding matrix indicator PMI, where the PMI indicates a precoding matrix. The precoding matrix has a structure of $W = W_1 W_2$, where $W_1$ is a block diagonal matrix in which each block matrix on a diagonal line is $X_i = A_i \otimes B_i$, and $i = 1, \ldots, N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving channel state information feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMO. Moreover, one or more PMIS are fed back based on a subset to indicate a precoding matrix, which fully uses time/frequency domain/spatial correlation of a channel, thereby greatly reducing feedback overheads.

Figure 2:
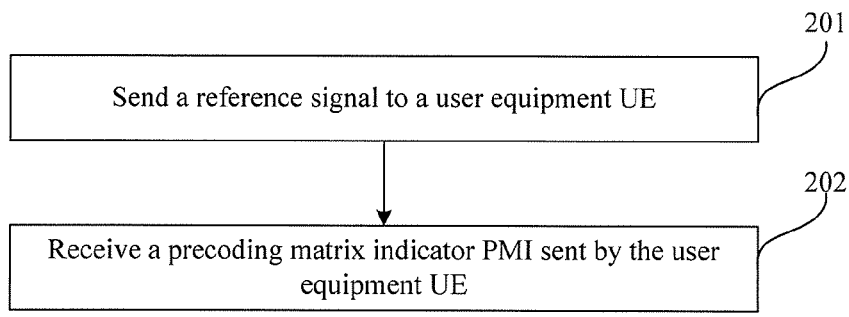
FIG. 2 is a flowchart of a second embodiment of a method for determining a precoding matrix indicator according to the present invention.

FIG. 2 is a flowchart of a second embodiment of a method for determining a precoding matrix indicator according to the present invention. As shown in the figure, this embodiment specifically includes:

Step 201: Send a reference signal to a user equipment UE.

Specifically, the reference signal may include a channel state information reference signal (channel state information Reference Signal, CSI RS), a demodulation reference signal (demodulation RS, DM RS), or a cell-specific reference signal (cell-specific RS, CRS). A base station eNB may notify the user equipment UE of a resource configuration of the reference signal by using RRC (Radio Resource Control) signaling or downlink control information (DCI), and instruct the UE to obtain the reference signal from a corresponding resource or subframe. The user equipment UE may also implicitly obtain, based on other information such as a cell identity ID, the resource configuration of the reference signal, and obtain the reference signal from the corresponding resource or subframe.

Step 202: Receive a precoding matrix indicator PMI sent by the user equipment UE, where the PMI corresponds to a precoding matrix selected by the user equipment, based on the reference signal, from a codebook; and a precoding matrix W included in the codebook is a product of two matrices $W_1$ and $W_2$, and the precoding matrix W has a structure shown in formulas (1) to (4).

Specifically, each column of the matrix $A_i$ or of the matrix $B_i$ may be a DFT vector or is a column vector of a Hadamard matrix, as shown in formulas (5) to (11); or specifically, the matrix $A_i$ or the matrix $B_i$ may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be those shown in formulas (12) to (23); or $B_i$ is a precoding matrix in a 4-antenna rank-4 codebook of an LTE R8 system.

In an example in which the number of block matrices is $N_B=2$ and there are 32 transmit antennas, matrices that form the precoding matrix W may separately be those shown in formulas (24) to (30); or $B_i$ is a precoding matrix in a 4-antenna rank-4 codebook of an LTE R8 system.

Specifically, the selecting, based on the reference signal, a precoding matrix from a codebook includes:

selecting, based on the reference signal, the precoding matrix from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include a subset of the matrix $W_1$, the matrix $A_i$, the matrix $B_i$, or the matrix $W_2$.

Further, the codebook subsets have a same subset of the matrix $W_1$, the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, $i \neq j$ may be unequal, or may also be equal. If there are multiple cases that $X_i$ and $X_j$, $i \neq j$ are equal, for example, $X_i$ and $X_j$, $i \neq j$ that are equal may appear in pairs, feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power equalization.

Specifically, the precoding matrix is included in a precoding matrix set or a codebook; and the PMI is used to indicate the selected precoding matrix in the precoding matrix set or the codebook.

Specifically, the receiving a precoding matrix indicator PMI sent by the user equipment UE includes: receiving the precoding matrix indicator PMI sent by the user equipment UE, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . , 15.

Specifically, the receiving a precoding matrix indicator PMI sent by the user equipment UE may also include: receiving precoding matrix indicators $PMI_1$ and $PMI_2$ sent by the user equipment UE, where $PMI_1$ and $PMI_2$ are used to indicate the matrix $X_i = A_i \otimes B_i$, $1 \leq i \leq N_B$ in formula (2) and the matrix $W_2$, respectively; and in this case, the matrix $X_i = A_i \otimes B_i$, $1 \leq i \leq N_B$ and the matrix $W_2$ are respectively indicated by $PMI_1$ and $PMI_2$ in the codebook; or receiving precoding matrix indicators $PMI_{11}$, $PMI_{12}$, and $PMI_2$ sent by the user equipment UE, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$, respectively; and in this case, the matrix $A_i$, $1 \leq i \leq N_B$, the matrix $B_i$, $1 \leq i \leq N_B$, and the matrix $W_2$ are respectively indicated by $PMI_{11}$, $PMI_{12}$, and $PMI_2$ in the codebook.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, the receiving a precoding matrix indicator PMI sent by the user equipment UE may also include: receiving precoding matrix indicators $PMI_{1,i}$, $1 \leq i \leq N_B$ and $PMI_2$ sent by the user equipment UE, where $PMI_{1,i}$, $1 \leq i \leq N_B$ and $PMI_2$ are used to indicate the matrix $X_i = A_i \otimes B_i$, $1 \leq i \leq N_B$ and the matrix $W_2$, respectively; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate the matrix $A_i$, $1 \leq i \leq N_B$ the matrix $B_i$, $1 \leq i \leq N_B$, and the matrix $W_2$, respectively; or receiving precoding matrix indicators $PMI_{1,i}$, $1 \leq i \leq N_B/2$, and $PMI_2$ sent by the user equipment UE, where $PMI_{1,i}$, $1 \leq i \leq N_B/2$ and $PMI_2$ are used to indicate a matrix $X_{2i-1} = X_{2i} = A_{2i} \otimes B_{2i}$, $1 \leq i \leq N_B/2$, and the matrix $W_2$, respectively; and in this case, $X_{2i-1} = X_{2i}$, and the matrices appear in pairs; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate a matrix $A_{2i-1} = A_{2i}$, $1 \leq i \leq N_B/2$, the matrix $B_{2i-1} = B_{2i}$, $1 \leq i \leq N_B/2$, and the matrix $W_2$, respectively; and in this case, $A_{2i-1} = A_{2i}$, $B_{2i-1} = B_{2i}$, and the matrices appear in pairs.

Specifically, the receiving a precoding matrix indicator PMI sent by the user equipment UE may be receiving, through a physical uplink control channel (Physical Uplink Control Channel, PUCCH) or a physical uplink shared channel (Physical Uplink Shared Channel, PUSCH), the precoding matrix indicator PMI sent by the user equipment UE.

Further, the receiving a precoding matrix indicator PMI sent by the user equipment UE may be separately receiving, by the base station by using different subframes or according to different periods, the foregoing $PMI_1$ and $PMI_2$; or $PMI_{11}$, $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$ that are sent by the user equipment UE; or may also be receiving the foregoing $PMI_1$ and $PMI_2$; or $PMI_{11}$, $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$ that are sent for different subbands or subband sizes in a frequency domain by the user equipment UE.

In this embodiment of the present invention, a base station eNB receives a precoding matrix indicator PMI sent by a user equipment UE, where the PMI indicates a precoding matrix. The precoding matrix has a structure of $W = W_1 W_2$, where $W_1$ is a block diagonal matrix in which each block matrix on a diagonal line is $X_i = A_i \otimes B_i$, and i=1, . . . , $N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving channel state information feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMO. Moreover, one or more PMIs are fed back based on a subset to indicate a precoding matrix, which fully uses time/frequency domain/spatial correlation of a channel, thereby greatly reducing feedback overheads.

The following describes a system for determining a precoding matrix indicator, a user equipment UE, and a base station eNB in the present invention in detail.

Figure 3:
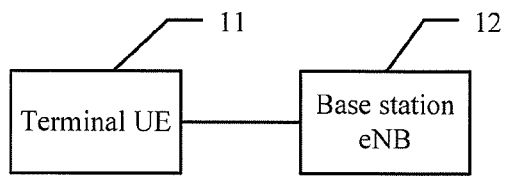
FIG. 3 is a schematic structural diagram of composition of a system for determining a precoding matrix indicator according to the present invention.

FIG. 3 is a schematic structural diagram of composition of an embodiment of a system for determining a precoding matrix indicator according to the present invention. The system according to this embodiment of the present invention includes a user equipment UE 11 and a base station eNB 12. For a structure of the user equipment UE 11, refer to FIG. 4; and for a schematic structural diagram of the base station eNB 12, refer to FIG. 5.

Figure 4:
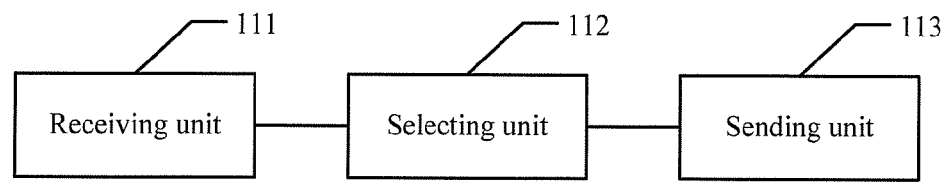
FIG. 4 is a schematic structural diagram of composition of a user equipment UE in FIG. 3.

FIG. 4 is a schematic diagram of a user equipment UE 11 for determining a precoding matrix indicator according to an embodiment of the present invention. As shown in the figure, the user equipment UE 11, includes: a receiving unit 111, a selecting unit 112, and a sending unit 113.

The receiving unit 111 is configured to receive a reference signal sent by a base station.

Specifically, the reference signal sent by the base station may include a channel state information reference signal (channel state information Reference Signal, CSI RS), a demodulation reference signal (demodulation RS, DM RS), or a cell-specific reference signal (cell-specific RS, CRS). The user equipment UE may obtain a resource configuration of the reference signal by receiving a notification (for example, RRC (Radio Resource Control) signaling or downlink control information DCI) from an eNB or based on a cell identity ID, and obtain the reference signal from a corresponding resource or subframe.

The selecting unit 112 is configured to select, based on the reference signal, a precoding matrix from a codebook, where a precoding matrix W included in the codebook is a product of two matrices $W_1$ and $W_2$; and the precoding matrix has the structure shown in formulas (1) to (4).

Specifically, each column of the matrix $A_i$ or of the matrix $B_i$ may be a DFT vector or may be a column vector of a Hadamard matrix, as shown in formulas (5) to (11); or specifically, the matrix $A_i$ or the matrix $B_i$ may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be those shown in formulas (12) to (23); or $B_i$ is a precoding matrix in a 4-antenna rank-4 codebook of an LTE R8 system.

In an example in which the number of block matrices is $N_B=2$ and there are 32 transmit antennas, matrices that form the precoding matrix W may separately be those shown in formulas (24) to (30); or $B_i$ is a precoding matrix in a 4-antenna rank-4 codebook of an LTE R8 system.

Specifically, the selecting, based on the reference signal, a precoding matrix from a codebook includes:

obtaining, by the user equipment UE based on the reference signal, a channel estimate; and selecting, based on a predefined criterion such as a channel capacity or throughput maximization criterion, the precoding matrix from the codebook according to the channel estimate. Selecting, based on a predefined criterion, a precoding matrix is an existing technology, and details are not described herein.

Further, the selecting, based on the reference signal, a precoding matrix from a codebook includes:

selecting, based on the reference signal, the precoding matrix from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include a subset of the matrix $W_1$, the matrix $A_i$, the matrix $B_i$, or the matrix $W_2$.

The selecting, based on the codebook subset, the precoding matrix can further reduce feedback overheads and implementation complexity.

Further, the codebook subsets have a same subset of the matrix $W_1$, the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, $i \neq j$ may be unequal, or may also be equal. If there are multiple cases that $X_i$ and $X_j$, $i \neq j$ are equal, for example, $X_i$ and $X_j$, $i \neq j$ that are equal may appear in pairs, the feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power balancing.

The sending unit 113 is configured to send a precoding matrix indicator PMI to the base station, where the PMI corresponds to the selected precoding matrix, so that the base station obtains the precoding matrix according to the PMI.

Specifically, the precoding matrix is included in a precoding matrix set or a codebook; and the PMI is used to indicate the selected precoding matrix in the precoding matrix set or the codebook.

Specifically, the sending a precoding matrix indicator PMI to the base station includes: sending the precoding matrix indicator PMI to the base station, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . , 15.

Specifically, the sending a precoding matrix indicator PMI to the base station may also include: sending precoding matrix indicators $PMI_1$ and $PMI_2$ to the base station, where $PMI_1$ and $PMI_2$ are used to indicate the matrix $X_i = A_i \otimes B_i$, $1 \leq i \leq N_B$ in formula (2) and the matrix $W_2$, respectively; and in this case, the matrix $X_i = A_i \otimes B_i$, $1 \leq i \leq N_B$ and the matrix $W_2$ are respectively indicated by $PMI_1$ and $PMI_2$ in the codebook; or sending precoding matrix indicators $PMI_{11}$, $PMI_{12}$, and $PMI_2$ to the base station, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$ respectively; and in this case, the matrix $A_i$, $1 \leq i \leq N_B$, the matrix $B_i$, $1 \leq i \leq N_B$ and the matrix $W_2$ are respectively indicated by $PMI_{11}$, $PMI_{12}$, and $PMI_2$ in the codebook.

Specifically, the sending a precoding matrix indicator PMI to the base station may also include: sending precoding matrix indicators $PMI_{1,i}$, $1 \leq i \leq N_B/2$ and $PMI_2$ to the base station, where $1 \leq i \leq N_B/2$ and $PMI_2$ are used to indicate a matrix $X_{2i-1} = X_{2i} = A_{2i} \otimes B_{2i}$, $1 \leq i \leq N_B/2$ and the matrix $W_2$, respectively; and in this case, $X_{2i-1} = X_{2i}$, and the matrices appear in pairs; or sending precoding matrix indicators $PMI_{11,i}$, $PMI_{12,i}$, and $PMI_2$ to the base station, where $PMI_{11,i}$, $PMI_{12,i}$, and $PMI_2$ are used to indicate a matrix $A_{2i-1}=A_{2i}$, $1 \leq i \leq N_B/2$, the matrix $B_{2i-1}=B_{2i}$, $1 \leq i \leq N_B/2$, and the matrix $W_2$, respectively; and in this case, $A_{2i-1}=A_{2i}$, $B_{2i-1}=B_{2i}$, and the matrices appear in pairs.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, the sending a precoding matrix indicator PMI to the base station may also include: sending precoding matrix indicators $PMI_{1,i}$, $1 \leq i \leq N_B$ and $PMI_2$ to the base station, where $PMI_{1,i}$, $1 \leq i \leq N_B$ and $PMI_2$ are used to indicate the matrix $X_i = A_i \otimes B_i$, $1 \leq i \leq N_B$ and the matrix $W_2$, respectively; or sending precoding matrix indicators $PMI_{11,i}$, $PMI_{12,i}$, and $PMI_2$ to the base station, where $PMI_{11,i}$, $PMI_{12,i}$, and $PMI_2$ are used to indicate the matrix $A_i$, $1 \leq i \leq N_B$, the matrix $B_i$, $1 \leq i \leq N_B$, and the matrix $W_2$, respectively.

Specifically, the sending a precoding matrix indicator PMI to the base station may be sending, by the UE, the precoding matrix indicator PMI to the base station through a physical uplink control channel (Physical Uplink Control Channel, PUCCH) or a physical uplink shared channel (Physical Uplink Shared Channel, PUSCH).

Further, the sending a precoding matrix indicator PMI to the base station may be separately sending, by the UE by using different subframes or according to different periods, the foregoing $PMI_1$ and $PMI_2$; or $PMI_{11}$, $PMI_{12}$, and $PMI_2$; or $PMI_{1,i}$, $1 \leq i \leq N_B$, and $PMI_2$; or $PMI_{11,i}$, $PMI_{12,i}$, $1 \leq i \leq N_B$, and $PMI_2$; or $PMI_{1,i}$, $1 \leq i \leq N_B/2$, and $PMI_2$; or $PMI_{11,i}$, $PMI_{12,i}$, $1 \leq i \leq N_B/2$ and $PMI_2$ to the base station.

Further, the sending a precoding matrix indicator PMI to the base station may also be separately sending, by the UE for different subbands or subband sizes in a frequency domain, the foregoing $PMI_1$ and $PMI_2$; or $PMI_{11}$, $PMI_{12}$, and $PMI_2$; or $PMI_{1,i}$, $1 \leq i \leq N_B$, and $PMI_2$; or $PMI_{11,i}$, $PMI_{12,i}$, $1 \leq i \leq N_B$, and $PMI_2$; or $PMI_{1,i}$, $1 \leq i \leq N_B/2$, and $PMI_2$; or $PMI_{11,i}$, $PMI_{12,i}$, $1 \leq i \leq N_B/2$ and $PMI_2$ to the base station.

In this embodiment of the present invention, a user equipment determines and sends a precoding matrix indicator PMI, where the PMI indicates a precoding matrix. The precoding matrix has a structure of $W=W_1 W_2$, where $W_1$ is a block diagonal matrix in which each block matrix on a diagonal line is $X_i = A_i \otimes B_i$, and $i=1, \ldots, N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving channel state information feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMO. Moreover, one or more PMIs are fed back based on a subset to indicate a precoding matrix, which fully uses time/frequency domain/spatial correlation of a channel, thereby greatly reducing feedback overheads.

Figure 5:
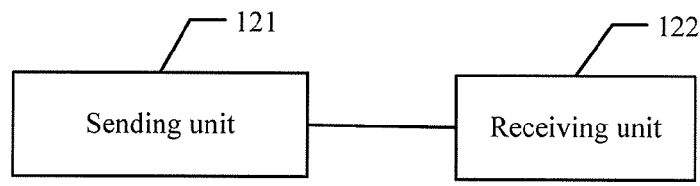
FIG. 5 is a schematic structural diagram of composition of a base station eNB in FIG. 3.

FIG. 5 is a base station eNB 12 for determining a precoding matrix indicator according to an embodiment of the present invention. As shown in the figure, the base station eNB 12 includes: a sending unit 121 and a receiving unit 122.

The sending unit 121 is configured to send a reference signal to a user equipment UE.

Specifically, the reference signal may include a channel state information reference signal (channel state information Reference Signal, CSI RS), a demodulation reference signal (demodulation RS, DM RS), or a cell-specific reference signal (cell-specific RS, CRS). A base station eNB may notify the user equipment UE of a resource configuration of the reference signal by using RRC (Radio Resource Control) signaling or downlink control information (DCI), and instruct the UE to obtain the reference signal from a corresponding resource or subframe. The user equipment UE may also implicitly obtain, based on other information such as a cell identity ID, the resource configuration of the reference signal, and obtain the reference signal from the corresponding resource or subframe.

The receiving unit 122 is configured to receive a precoding matrix indicator PMI sent by the user equipment UE, where the PMI corresponds to a precoding matrix selected, based on the reference signal, from a codebook by the user equipment; and a precoding matrix W included in the codebook is a product of two matrices $W_1$ and $W_2$, and the precoding matrix W has the structure shown in formulas (1) to (4).

Specifically, each column of the matrix $A_i$ or of the matrix $B_i$ may be a DFT vector or may be a column vector of a Hadamard matrix, as shown in formulas (5) to (11); or specifically, the matrix $A_i$ or the matrix $B_i$ may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be those shown in formulas (12) to (23); or $B_i$ is a precoding matrix in a 4-antenna rank-4 codebook of an LTE R8 system.

In an example in which the number of block matrices is $N_B=2$ and there are 32 transmit antennas, matrices that form the precoding matrix W may separately be those shown in formulas (24) to (30); or $B_i$ is a precoding matrix in a 4-antenna rank-4 codebook of an LTE R8 system.

Specifically, the precoding matrix selected, based on the reference signal, from a codebook includes: the precoding matrix selected, based on the reference signal, from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include a subset of the matrix $W_1$, the matrix $A_i$, the matrix $B_i$, or the matrix $W_2$.

Further, the codebook subsets have a same subset of the matrix $W_1$, the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, $i \neq j$ may be unequal, or may also be equal. If there are multiple cases that $X_i$ and $X_j$, $i \neq j$ are equal, for example, $X_i$ and $X_j$, $i \neq j$ that are equal may appear in pairs, feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power balancing.

Specifically, the precoding matrix is included in a precoding matrix set or a codebook; and the PMI is used to indicate the selected precoding matrix in the precoding matrix set or the codebook.

Specifically, the receiving a precoding matrix indicator PMI sent by the user equipment UE includes: receiving the precoding matrix indicator PMI sent by the user equipment UE, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . , 15.

Specifically, the receiving a precoding matrix indicator PMI sent by the user equipment UE may also include: receiving precoding matrix indicators $PMI_1$ and $PMI_2$ sent by the user equipment UE, where $PMI_1$ and $PMI_2$ are used to indicate the matrix $X_i = A_i \otimes B_i$, $1 \leq i \leq N_B$ in formula (2) and the matrix $W_2$, respectively; and in this case, the matrix $X_i = A_i \otimes B_i$, $1 \leq i \leq N_B$ and the matrix $W_2$ are respectively indicated by $PMI_1$ and $PMI_2$ in the codebook; or receiving precoding matrix indicators $PMI_{11}$, $PMI_{12}$, and $PMI_2$ sent by the user equipment UE, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$, respectively; and in this case, the matrix $A_i$, $1 \leq i \leq N_B$, the matrix $B_i$, $1 \leq i \leq N_B$, and the matrix $W_2$ are respectively indicated by $PMI_{11}$, $PMI_{12}$, and $PMI_2$ in the codebook.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, the receiving a precoding matrix indicator PMI sent by the user equipment UE may also include: receiving precoding matrix indicators $PMI_{1,i}$, $1 \leq i \leq N_B$ and $PMI_2$ sent by the user equipment UE, where $PMI_{1,i}$, $1 \leq i \leq N_B$ and $PMI_2$ are used to indicate the matrix $X_i = A_i \otimes B_i$, $1 \leq i \leq N_B$ and the matrix $W_2$, respectively; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate the matrix $A_i$, $1 \leq i \leq N_B$, the matrix $B_i$, $1 \leq i \leq N_B$ and the matrix $W_2$, respectively; or receiving precoding matrix indicators $PMI_{1,i}$, $1 \leq i \leq N_B/2$, and $PMI_2$ sent by the user equipment UE, where $PMI_{1,i}$, $1 \leq i \leq N_B/2$ and $PMI_2$ are used to indicate a matrix $X_{2i-1} = X_{2i} = A_{2i} \otimes B_{2i}$, $1 \leq i \leq N_B/2$, and the matrix $W_2$, respectively; and in this case, $X_{2i-1} = X_{2i}$, and the matrices appear in pairs; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate a matrix $A_{2i-1} = A_{2i}$, $1 \leq i \leq N_B/2$, the matrix $B_{2i-1} = B_{2i}$, $1 \leq i \leq N_B/2$, and the matrix $W_2$, respectively; and in this case, $A_{2i-1} = A_{2i}$, $B_{2i-1} = B_{2i}$, and the matrices appear in pairs.

Specifically, the receiving a precoding matrix indicator PMI sent by the user equipment UE may be receiving, through a physical uplink control channel (Physical Uplink Control Channel, PUCCH) or a physical uplink shared channel (Physical Uplink Shared Channel, PUSCH), the precoding matrix indicator PMI sent by the user equipment UE.

Further, the receiving a precoding matrix indicator PMI sent by the user equipment UE may be separately receiving, by the base station by using different subframes or according to different periods, the foregoing precoding matrix indicators sent by the user equipment UE, which are $PMI_1$ and $PMI_2$; or $PMI_{11}$, $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$; or may also be receiving the foregoing $PMI_1$ and $PMI_2$; or $PMI_{11}$, $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$ that are sent for different subbands or subband sizes in a frequency domain by the user equipment UE.

In this embodiment of the present invention, the base station eNB receives a precoding matrix indicator PMI sent by the user equipment UE, where the PMI indicates a precoding matrix. The precoding matrix has a structure of $W = W_1 W_2$, where $W_1$ is a block diagonal matrix in which each block matrix on a diagonal line is $X_i = A_i \otimes B_i$, and $i = 1, \ldots, N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving CSI feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMO. Moreover, one or more PMIS are fed back based on a subset to indicate a precoding matrix, which fully uses time/frequency domain/spatial correlation of a channel, thereby greatly reducing feedback overheads.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described structures and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), memory, a read-only memory (ROM), an electrically programmable ROM, an electrically erasable programmable ROM, a register, a hard disk, a removable disk, a CD-ROM, or any other form of storage medium known in the art.

The foregoing specific embodiments further describe the objectives, technical solutions, and beneficial effects of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for determining a precoding matrix indicator, the method comprising:
    receiving, by a user equipment, a reference signal sent by a base station;
    selecting, by the user equipment, based on the reference signal, a precoding matrix from a codebook, wherein a precoding matrix W comprised in the codebook is a product of two matrices $W_1$ and $W_2$, wherein $W_1$ is a block diagonal matrix, $W_1 = \text{diag}\{X_1, \ldots, X_{N_B}\}$, wherein each block matrix $X_i$ is a Kronecker product of a matrix $A_i$ and a matrix $B_i$, $X_i = A_i \otimes B_i$, and $1 \leq i \leq N_B$, and the $W_1$ comprises at least one block matrix, $N_B \geq 1$; and
    sending, by the user equipment, a precoding matrix indicator (PMI) to the base station, wherein the PMI corresponds to the selected precoding matrix.

2. The method according to claim 1, wherein each column of the matrix $A_i$ or the matrix $B_i$ in the block matrix $X_i = A_i \otimes B_i$ is a discrete Fourier transform (DFT) vector or is a column vector of a Hadamard matrix.

3. The method according to claim 1, wherein the matrix $A_i$ or the matrix $B_i$ in the block matrix $X_i = A_i \otimes B_i$ is selected from a 2-antenna codebook, a 4-antenna codebook, or an 8-antenna codebook of a Long Term Evolution (LTE) system.

4. The method according to claim 1, wherein selecting, based on the reference signal, a precoding matrix from a codebook comprises:
    selecting, based on the reference signal, the precoding matrix from a codebook subset that is predefined, or reported by a mobile terminal, or locally determined.

5. The method according to claim 1, wherein sending a precoding matrix indicator (PMI) to the base station comprises:
    sending a first precoding matrix indicator $PMI_1$ and a second precoding matrix indicator $PMI_2$ to the base station, wherein the first precoding matrix indicator $PMI_1$ is used to indicate the matrix $X_i = A_i \otimes B_i$ and the second precoding matrix indicator $PMI_2$ is used to indicate the matrix $W_2$; or
    sending a third precoding matrix indicator $PMI_{11}$, a fourth precoding matrix indicator $PMI_{12}$, and a fifth precoding matrix indicator $PMI_2$ to the base station, wherein the third precoding matrix indicator $PMI_{11}$ is used to indicate the matrix $A_i$ wherein $1 \leq i \leq N_B$; the fourth precoding matrix indicator $PMI_{12}$ is used to indicate the matrix $B_i$, wherein $1 \leq i \leq N_B$, and the fifth precoding matrix indicator $PMI_2$ is used to indicate the matrix $W_2$.

6. A method for determining a precoding matrix indicator, the method comprising:
    sending, by a base station, a reference signal to a user equipment (UE); and
    receiving, by the base station, a precoding matrix indicator (PMI) sent by the UE, wherein the PMI corresponds to a precoding matrix that is selected by the UE, based on the reference signal, from a codebook, wherein a precoding matrix W comprised in the codebook is a product of two matrices $W_1$ and $W_2$, wherein $W_1$ is a block diagonal matrix, $W_1 = \text{diag}\{X_1, \ldots, X_{N_B}\}$, wherein each block matrix $X_i$ is a Kronecker product of a matrix $A_i$ and a matrix $B_i$, $X_i = A_i \otimes B_i$, and $1 \leq i \leq N_B$, and the matrix $W_1$ comprises at least one block matrix, $N_B \geq 1$.

7. The method according to claim 6, wherein each column of the matrix $A_i$ or the matrix $B_i$ in the block matrix $X_i = A_i \otimes B_i$ is a discrete Fourier transform (DH) vector or is a column vector of a Hadamard matrix.

8. The method according to claim 6, wherein the matrix $A_i$ or the matrix $B_i$ in the block matrix $X_i = A_i \otimes B_i$ is selected from a 2-antenna codebook, a 4-antenna codebook, or an 8-antenna codebook of a Long Term Evolution (LTE) system.

9. The method according to claim 6, wherein the precoding matrix that is selected, based on the reference signal, from the codebook comprises:
    selecting, based on the reference signal, the precoding matrix from a codebook subset that is predefined, or reported by the UE, or locally determined.

10. The method according to claim 6, wherein receiving a precoding matrix indicator PMI sent by the UE comprises:
    receiving a first precoding matrix indicator $PMI_1$ and a second precoding matrix indicator $PMI_2$, that are sent by the user equipment UE, wherein the first precoding matrix indicator $PMI_1$ is used to indicate the matrix $X_i = A_i \otimes B_i$ and the second precoding matrix indicator $PMI_2$ is used to indicate the matrix $W_2$; or
    receiving a third precoding matrix indicator $PMI_{11}$, a fourth precoding matrix indicator $PMI_{12}$, and a fifth precoding matrix indicator $PMI_2$ that are sent by the UE, wherein the third precoding matrix indicator $PMI_{11}$ is used to indicate the matrix $A_i$, wherein $1 \leq i \leq N_B$, the fourth precoding matrix indicator $PMI_{12}$ is used to indicate the matrix $B_i$, wherein $1 \leq i \leq N_B$, and the fifth precoding matrix indicator $PMI_2$ is used to indicate the matrix $W_2$.

11. A user equipment (UE), comprising:
    a receiving unit, configured to receive a reference signal sent by a base station;
    a selecting unit, configured to select, based on the reference signal, a precoding matrix from a codebook, wherein a precoding matrix W comprised in the codebook is a product of two matrices $W_1$ and $W_2$, wherein $W_1$ is a block diagonal matrix, $W_1 = \text{diag}\{X_1, \ldots, X_{N_B}\}$, wherein each block matrix $X_i$ is a Kronecker product of a matrix $A_i$ and a matrix $B_i$, $X_i = A_1 \otimes B_i$, and $1 \leq i \leq N_B$, and the $W_1$ comprises at least one block matrix, $N_B \geq 1$; and
    a sending unit, configured to send a precoding matrix indicator (PMI) to the base station, wherein the PMI corresponds to the selected precoding matrix.

12. The user equipment according to claim 11, wherein each column of the matrix $A_i$ or the matrix $B_i$ in the block matrix $X_i = A_i \otimes B_i$ is a discrete Fourier transform (DE I')) vector or is a column vector of a Hadamard matrix.

13. The user equipment according to claim 11, wherein the matrix $A_i$ or the matrix $B_i$ in the block matrix $X_i = A_i \otimes B_i$ is selected from a 2-antenna codebook, a 4-antenna codebook, or an 8-antenna codebook of a Long Term Evolution (LTE) system.

14. The user equipment according to claim 11, wherein the selecting unit is configured to select, based on the reference signal, the precoding matrix from a codebook subset that is predefined or locally determined.

15. The user equipment according to claim 11, wherein the sending unit is configured to:
    send a first precoding matrix indicator $PMI_1$ and a second precoding matrix indicator $PMI_2$ to the base station, wherein the first precoding matrix indicator $PMI_1$ is used to indicate the matrix $X_i = A_i \otimes B_i$, and the second precoding matrix indicator $PMI_2$ is used to indicate the matrix $W_2$; or send a third precoding matrix indicator $PMI_{11}$, a fourth precoding matrix indicator $PMI_{12}$, and a fifth precoding matrix indicator $PMI_2$ to the base station, wherein the third precoding matrix indicator $PMI_{11}$ is used to indicate the matrix $A_i$, wherein $1 \le i \le N_B$, the fourth precoding matrix indicator $PMI_{12}$ is used to indicate the matrix $B_i$, wherein $1 \le i \le N_B$, and the fifth precoding matrix indicator $PMI_2$ is used to indicate the matrix $W_2$.

16. A base station, comprising:
   a sending unit, configured to send a reference signal to a user equipment UE; and
   a receiving unit, configured to receive a precoding matrix indicator (PMI) sent by the UE, wherein the PMI corresponds to a precoding matrix that is selected by the UE, based on the reference signal, from a codebook, wherein a precoding matrix W comprised in the codebook is a product of two matrices $W_1$ and $W_2$, wherein $W_1$ is a block diagonal matrix, $W_1 = \text{diag}\{X_1, \ldots, X_{N_B}\}$, wherein each block matrix $X_i$ is a Kronecker product of a matrix $A_i$ and a matrix $B_i$, $X_i = A_i \otimes B_i$, and $1 \le i \le N_B$, and the matrix $W_1$ comprises at least one block matrix, $N_B \ge 1$.

17. The base station according to claim 16, wherein each column of the matrix $A_i$ or the matrix $B_i$ in the block matrix $X = A_i \otimes B_i$ is a discrete Fourier transform (DFT) or is a column vector of a Hadamard matrix.

18. The base station according to claim 16, wherein the matrix $A_i$ or the matrix $B_i$ in the block matrix $X_i = A_i \otimes B_i$ is selected from a 2-antenna codebook, a 4-antenna codebook, or an 8-antenna codebook of a Long Term Evolution (LTE) system.

19. The base station according to claim 16, wherein the selecting unit is configured to select, based on the reference signal, the precoding matrix from a codebook subset that is predefined, or reported by the UE, or locally determined.

20. The base station according to claim 16, wherein the receiving unit is configured to:
   receive a first precoding matrix indicator $PMI_1$ and a second precoding matrix indicator $PMI_2$ that are sent by the UE, wherein the first precoding matrix indicator $PMI_1$ is used to indicate the matrix $X_i = A_i \otimes B_i$, and the second precoding matrix indicator $PMI_2$ is used to indicate the matrix $W_2$; or
   receive a third precoding matrix indicator $PMI_{11}$, a fourth precoding matrix indicator $PMI_{12}$, and a fifth precoding matrix indicator $PMI_2$ that are sent by the UE, wherein the third precoding matrix indicator $PMI_{11}$ is used to indicate the matrix $A_i$, wherein $1 \le i \le N_B$, the fourth precoding matrix indicator $PMI_{12}$ is used to indicate the matrix $B_i$, wherein $1 \le i \le N_B$ and the fifth precoding matrix indicator $PMI_2$ is used to indicate the matrix $W_2$.

* * * * *